United States Patent
Root et al.

(10) Patent No.: US 6,438,675 B1
(45) Date of Patent: *Aug. 20, 2002

(54) VARIABLE FORMAT MEMORY ACCESS DEVICE

(75) Inventors: Gary Root, Harleysville; Richard J. Selvaggi, Doylestown, both of PA (US)

(73) Assignee: ATI Technologies, Inc., Markham (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,182

(22) Filed: Mar. 23, 1998

(51) Int. Cl.$^7$ .............................................. G06F 13/00
(52) U.S. Cl. ........................ 711/217; 711/100; 345/516
(58) Field of Search ................................ 711/220, 217, 711/218, 206, 203, 209, 100; 345/516

(56) References Cited

U.S. PATENT DOCUMENTS 5,426,748 A * 6/1995 Brenza et al. .............. 711/203
5,548,746 A * 8/1996 Carpenter et al. .............. 710/3
5,659,580 A * 8/1997 Partyka ....................... 375/295
5,664,160 A * 9/1997 Fecteau et al. ......... 395/500.44
5,774,135 A * 6/1998 Letham ...................... 345/516

* cited by examiner

Primary Examiner—David Hudspeth
Assistant Examiner—Fred F. Tzeng
(74) Attorney, Agent, or Firm—Vedder, Price, Kaufman & Kammholz

(57) ABSTRACT

A memory access device is presented that synchronously transfers data between contiguous memory locations and a set of potentially non-contiguous registers, via a single load, or move, command. An address generator generates a series of contiguous memory addresses and a corresponding set of potentially non-contiguous register addresses in dependence upon the contents of a variable format command. In this manner, the data transfer efficiencies achievable by a block transfer of contiguous data elements can be achieved while simultaneously transferring the data to and from non-contiguous register locations. The memory access device may also include a data converter which optionally converts the data elements contained in memory to and from another form, such as from integer to floating point, during the data transfer process.

32 Claims, 7 Drawing Sheets

VARIABLE FORMAT MEMORY ACCESS DEVICE

FIELD OF THE INVENTION

This invention relates to the field of computer systems, and in particular to data access techniques.

BACKGROUND OF THE INVENTION

The processing of data often requires the movement of data from one form of storage to another. As a program executes, for example, data is read from a memory device into registers, or temporary storage devices, for subsequent processing. The resultant processed data, contained in the same or different registers, is thereafter written back to the same or a different memory device.

Conventionally, data processing devices that process data contain memory access devices that facilitate the data transfer from memory to registers within the device. These memory access devices ease the programming task for processing the data by providing high-level commands to effect the data transfer. That is, for example, such devices will provide for a "MOVE N, Src, Dest" command. This command moves N data elements from a source device, starting at the Src address, into a destination device, starting at the Dest address. The particular structure of a MOVE N command will vary among systems. For ease of understanding, the term MOVE N command used herein implies the transfer of N data elements, regardless of the data element size. Common synonymous terms for this MOVE N function are block data transfers, block reads, block writes, etc. Note that the very structure of this command necessitates a presumed ordering of the data elements to be moved, within the context of this command. That is, it is presumed that the transfer will be of N data elements from N contiguous locations in the source, starting from the Src address, to N contiguous destination addresses, starting from the Dest address. There is also a presumed or predefined direction of sequential address determination. That is, it is predefined whether the N contiguous data elements are located at addresses counting up from the Src address, or counting down from the Src address.

Block transfers provide for both programming and memory access efficiencies. For example, the memory device may be a spinning disk. If the memory access device accesses each data element independently, each transfer will incur a "seek" delay while waiting for the appropriate disk location to arrive at the head used to transfer the information. A block data transfer for a disk drive is designed to incur the seek delay for the first data element, then access sequential data from the disk at a rate commensurate with the rotation of the disk. Similarly, data access from memory devices such as RAM or ROM devices can be made more efficient by block data transfers. Often, there is a time delay associated with gaining access to the device, for example due to contention of a data bus of a computer system. Once access is granted, efficiencies can be achieved by transferring as many data elements as needed, thereby avoiding access delays for each data element.

Special purpose processing devices or applications commonly structure the processing of data to be consistent with the ordering of the registers used to send and receive the information to and from memory. That is, for example, if it is known that data elements A, B, and C are stored in memory contiguously at addresses M, M+1, and M+2, a first register address R in the processing device will be designated as the location that will contain the data element A; the next contiguous register, at R+1, will contain the data element B; and the next contiguous register, at R+2 will contain the data element C. In this manner, a "MOVE 3, M, R" command will effect the direct transfer of the information A, B, C, from the memory to the registers. Thereafter, subprocesses within the processing device will access registers R, R+1, and R+2 whenever the data elements A, B, and C, respectively, are required.

As processing devices and applications become more and more complex, the number of data elements comprising the set of parameters used by the processing device or application increases dramatically. Consider, for example, the area of computer graphics. Relatively primitive graphics devices circa 1980 accepted a set of three (X, Y, RGB) parameters, and illuminated a picture element (pixel) on a display at location X, Y with a color combination corresponding to the red R, green G, and blue B color values. The Microsoft DirectX™ standard that is used for graphic devices circa 1997 includes up to 16 different parameters, with 'reserved' capabilities to add others. (DirectX is a Trademark of Microsoft Corporation.) These parameters allow for three dimensional renderings with visibility determination, texturing, lighting, and so on. The graphics devices used to display these renderings have internal registers which are structured to contain each of these parameters, commonly structured to match the data structure in memory that conforms to the DirectX™ standard. In this manner, a single MOVE 16 command effects the direct and efficient transfer of these parameters from the memory to the registers, as discussed above.

The transfer of all the parameters that are supported by a processing device for each processing operation can be very inefficient. For example, a simple illumination of a pixel only requires three parameters, as discussed above. The transfer of 16 parameters each time a pixel is to be simply illuminated results in a significant data transfer inefficiency. For this reason, "variable format" specifications have been developed. Commonly, a format command is communicated to the receiving processing device; this format command indicates which of the plurality of parameters will be communicated in a series of subsequent commands. In the simple illumination case, for example, the format command will indicate that only the X, Y, and RGB parameters need be communicated. To optimize data transfer, the process that is providing the X, Y, and RGB data elements for each pixel illumination places them in contiguous memory locations, independent of the data structure used to contain the full set of parameters. Thereafter, a MOVE 3 command will effect the transfer of these contiguously located data elements. This format is utilized to transfer subsequent data elements X, Y, and RGB until a new format command is received.

Unfortunately, the use of the MOVE 3 command will provide efficiency for transferring the data elements from the memory, but will place these storage elements in register locations which will not necessarily correspond to the structure of the internal registers assigned to contain these data elements. That is, the registers assigned for containing the X, Y, and RGB data elements may not be contiguous. Because the format for receiving data elements is variable and will not necessarily match the structure of the registers assigned to contain particular data elements, conventional memory access devices utilize a MOVE N command to receive the variably formatted data elements into contiguous "temporary" registers. Subsequent individual MOVE commands are then executed to move the data elements from the temporary registers to the appropriate assigned register locations. Such a memory access device, however, requires enough temporary registers to contain the maximum number of possible parameters, effectively doubling the number of registers required to contain the parameters. To minimize the number of registers required, another conventional approach is to forego the efficiencies of a MOVE N command and issue individual commands to move each data element from memory to its assigned register location. Some optimization may be provided, for example by using a block transfer for those data elements which are contained in the format command and also are assigned contiguous register locations, and individual commands for data elements which are assigned non-contiguous register locations, but such an approach obviates the programming advantages provided by a single MOVE N command.

Therefore, a need exists for a memory access device that can provide the access and transfer efficiencies of block transfers for data elements that are contiguously stored in memory to and from non-contiguous register locations. A need also exists for the memory access device to facilitate such a block transfer via a single block transfer command, such as MOVE N, Src, Dest.

DETAILED DESCRIPTION OF THE INVENTION

In accordance with this invention, the memory access device that transfers data between a memory and a set of registers contains an address generator which generates a series of contiguous memory addresses and a corresponding set of potentially non-contiguous register addresses in dependence upon the contents of a variable format command. In this manner, the data transfer efficiencies achievable by a block transfer of contiguous data elements can be achieved while simultaneously transferring the data to and from non-contiguous register locations. In a preferred embodiment, the address generator includes a data mapper which provides a register address corresponding to each of the contiguous memory addresses, based on a register mask that is determined based on the variable format command. In a further embodiment of this invention, the memory access device also includes a data converter which optionally converts the data elements contained in memory to and from another form, such as from integer to floating point, or floating point to fixed point, during the data transfer process.

Thus far, the terms memory and register have been used to distinguish devices used to store data elements. This distinction is arbitrary. Both registers and memory are used to store data at identifiable locations. The term memory has been used thus far to identify a storage device that traditionally contains data elements that are stored contiguously, for which a block data access is particularly efficient. Registers have been used to identify locations for non-contiguous data storage that may or may not benefit from a block data access. This convention will be used herein, although, as would be evident to one of ordinary skill in the art, the invention presented herein is equally applicable, albeit somewhat less efficient, for transferring data: between contiguous registers and non-contiguous memory addresses; between contiguous registers and non-contiguous registers; or between contiguous memory addresses and non-contiguous memory addresses.

Figure 1:
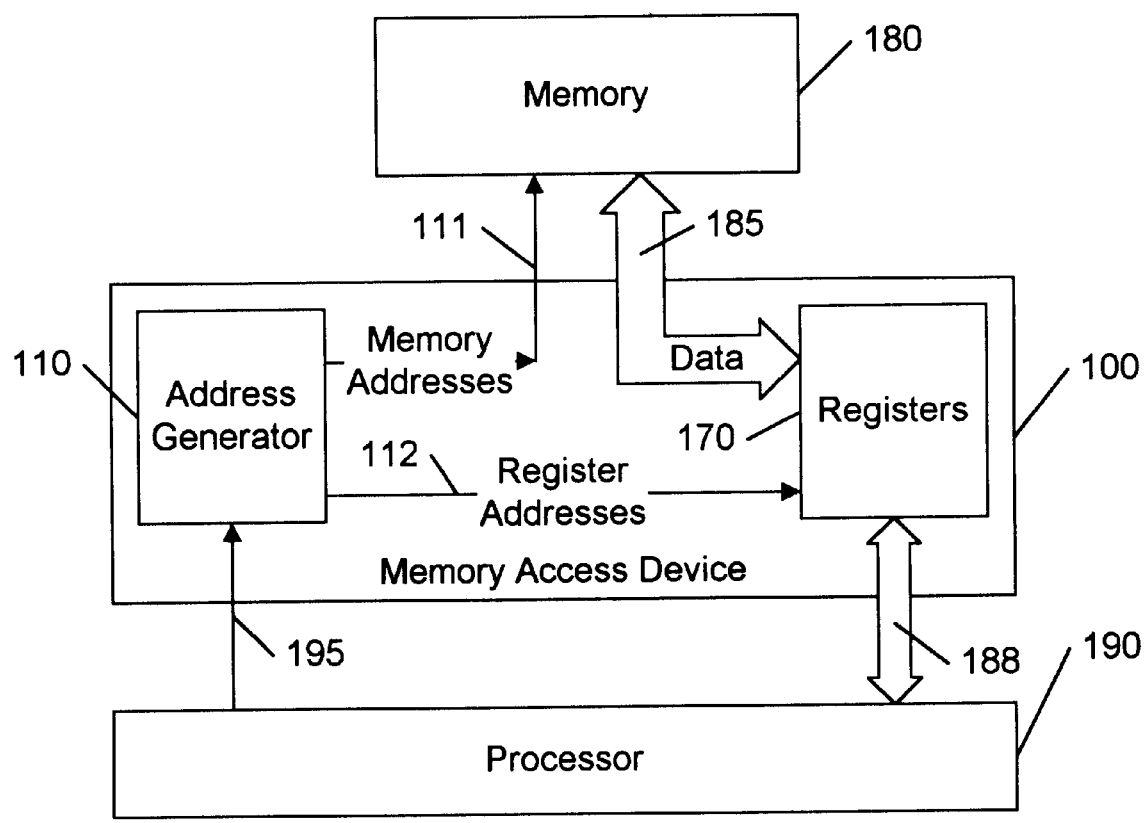
FIG. 1 illustrates a block diagram of an embodiment of a data processing device in accordance with this invention.

FIG. 1 shows a block diagram of a memory access device that includes a memory 180, a memory access device 100, and a processor 190. The processor 190 communicates commands 195 to the memory access device 100 to access data elements (now shown) contained in the memory 180. In response to the commands 195 from the processor 190, the memory access device 100 communicates a plurality of memory addresses 111 to the memory 180 to establish access 185 to the data elements located at the memory addresses 111. Once access 185 is established, a data transfer occurs between the memory addresses 111 and registers having register addresses 112 within the plurality of registers 170. An address generator 110 generates the appropriate memory addresses and corresponding register addresses, depending upon the particular commends 195 from the processor 190. The transfer is either to or from memory address 111 from or to register address 112, depending upon the particular commands 195 from the processor 190. The address generator 110 is structured to provide sequential memory addresses 111, so as to efficiently access contiguous memory locations. Synchronous with the generation of the sequential memory addresses 111, the address generator provides corresponding register addresses 112 that address registers in the plurality of registers 170. In accordance with this invention, the corresponding register addresses 112 need not be contiguous, even though the memory addresses 111 are contiguous. Data may be read from or written to each of the registers 170 by the processor 190, via the data access path 188. Typically, the memory access device 100 is integral to the processor 190, for example co-located with the processor on an integrated circuit chip, so that the registers 170 are directly accessible by the processor 190.

For ease of understanding, hereinafter the invention will be presented, in general, in the context of data elements being transferred from the memory 180 to the registers 170. It will be apparent to one of ordinary skill in the art that the principles presented herein are equally applicable to the transfer of data elements from registers 170 to the memory 180.

Figure 2:
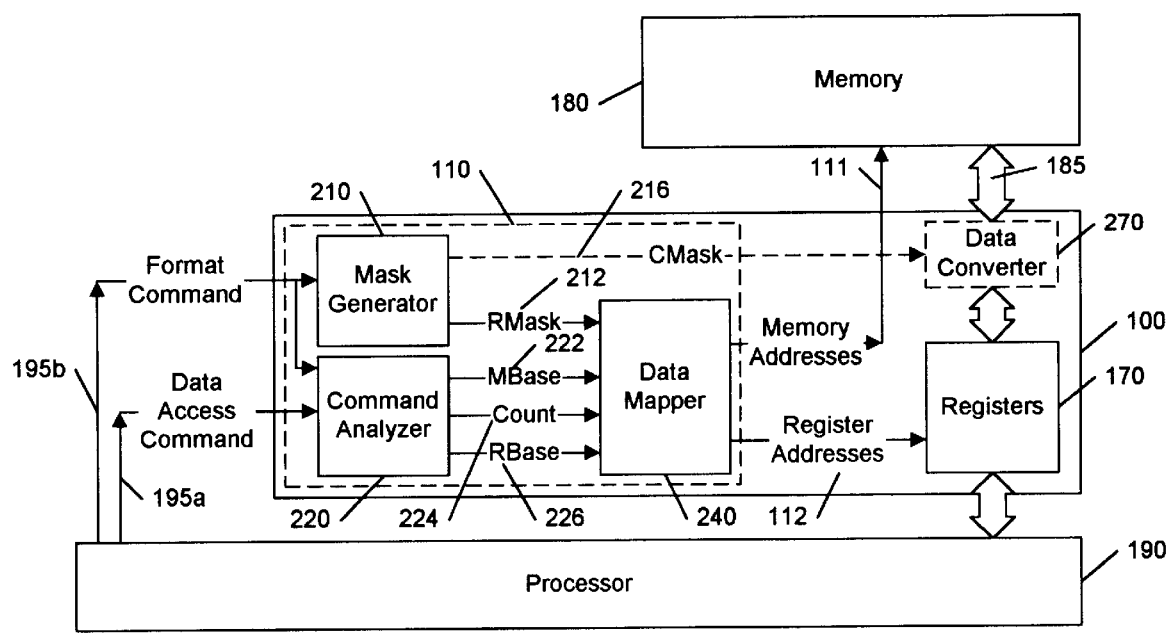
FIG. 2 illustrates a block diagram of a data processing device that includes an embodiment of a memory access device in accordance with this invention.

FIG. 2 shows another block diagram of a memory access device, wherein the address generator 110 includes a mask generator 210, a command analyzer 220, and a data mapper 240, in an embodiment of this invention. One of the commands 195 communicated from the processor 190 to the address generator 110 is a variable format command 195b. The format command 195b defines which data elements are located in contiguous memory locations. This variable format command 195b will have been communicated to the processor 190, for example, from another processor (not shown) that placed the data elements in the contiguous memory locations. In the context of data transfer to memory, the processor 190 will typically initiate the format command 195b and communicate it to the address generator 110 and to the other processor (not shown) that is intended to receive the data elements in the contiguous memory locations. The mask generator 210 processes the format command to generate a register mask 212 that is used by the data mapper 240 to determine which registers 170 are associated with each of the contiguous memory locations. The variable format command 195b may contain an explicit identification of the mapping between each memory location and each intended register location. More commonly, the variable format command 195b will contain an implicit mapping. In an implicit mapping, the registers 170 have a predetermined allocation of register addresses to specific data parameters, and the variable format command 195b identifies those parameters which have been assigned contiguous memory locations. For example, the register having an address R1 may be allocated to contain an X parameter, R2 a Y parameter, R3 a Z parameter, R4 a color parameter, and R5 a texture parameter, the registers R1 . . . R5 being contiguous in ascending numerical order. The variable format command 195b may communicate to the address generator 110 that the contiguous data elements in memory 180 will be an X parameter, a Y parameter, and a color parameter, in that order. The mask generator 210 will assess the variable format command 195b and generate a register mask 212 which indicates to the data mapper 240 that the contiguous memory addresses 111 are to be associated with, or mapped to, register addresses 112 of R1, R2, and R4, in that order. Note that register R4 is not contiguous with register R2.

The format command 195b is also available to the command analyzer 220. The command analyzer 220 determines the number of contiguous memory locations to read 224, based on the variable format command 195b and, at option, based on subsequent data access commands 195a. The number of contiguous memory locations to be read, the count 224, should not be greater than the number of contiguous parameters specified in the variable format command 195b, but it may be less. For example, the processor 190 may be performing a search task that only requires access to the X and Y parameters of the example above. Thus, although the example variable format command 195b communicated the fact that three parameters X, Y, and RGB are stored contiguously, the memory access device 100 need only read the first two of the contiguous memory locations. Note that this assessment of the data access commands 195a is optional, because reading fewer locations than are available is an optional optimization technique.

The command analyzer 220 also assesses the subsequent data access commands 195a to determine the starting, or base, memory address 222 and the register base address 226. The register base address 226 may be explicitly contained in the data access commands 195a, implicitly determinable, or predefined. For example, if it is known that the set of parameters are allocated to registers R1 . . . R5 as above, the register base address can be predefined to be address R1. If alternative sets of parameters are allocated to the registers 170, the variable format command 195b may identify which set of parameters are being accessed, from which the appropriate register base address can be implicitly determined, based on the allocation. In accordance with the preferred embodiment of this invention, the count 224, the memory base address 222 and the register base address 226 are explicitly contained in a MOVE N, Src, Dest command. In this embodiment, N is the count 224, and Src and Dest are the memory base address 222 and the register base address 226 respectively, for a transfer from memory 180 to the registers 170, and vice versa for a transfer from the registers 170 to memory 180.

The data mapper 240 uses the count 224 to generate N pair of corresponding memory addresses 111 and register addresses 112, where N is equal to the count 224. The memory addresses 111 start at the memory base address and continue for N contiguous memory addresses. The corresponding register addresses 112 are determined based on the register base address 226 and the register mask 212.

Also shown in FIG. 2 is an optional data converter 270. Often, the format of a data element in memory 180 is different from the format of data element as used by the processor 190. That is, for example, a scaling parameter may be stored in memory 190 as a floating point variable. The processor 190 may be designed to perform integer operations exclusively. The data converter 270 in this example performs a float-to-integer conversion, as the data element is being transferred from memory 180 to registers 170, and an integer-to-float conversion as the data element is being transferred from the registers 170 to the memory 180. The identification of which of the contiguous data elements in memory 180 are to be converted is communicated to the mask generator 210 via the variable format command 195b, either explicitly or implicitly. The mask generator 110 generates a conversion mask 216 to control the data converter 270 in synchronization with the memory addresses 111, so that the appropriate data elements in memory 180 either undergo a conversion or remain in the same format during the transfer of the data element.

Figure 3:
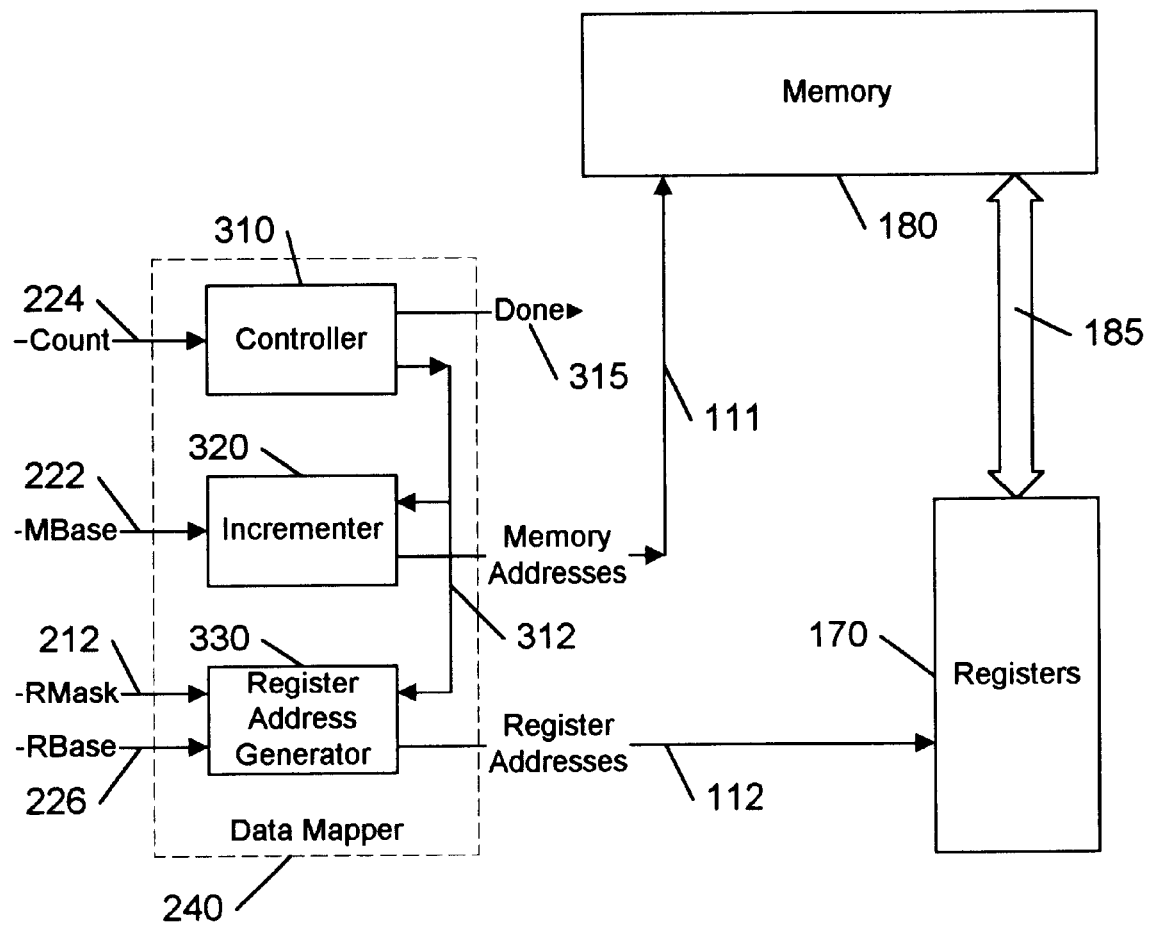
FIG. 3 illustrates a block diagram of an embodiment of a data mapper in accordance with this invention.

FIG. 3 shows a block diagram of an embodiment of a data mapper 240 that includes a controller 310, an incrementer 320, and a register address generator 330. The controller 310 uses the count 224 to generate a control signal 312 that triggers the incrementer 320 and register address generator 330 to synchronously generate memory addresses 111 and register addresses 112 respectively. The controller 310 also generates an optional done signal 315 to signal the completion of the data access command 195a (FIG. 2) that initiated the current data element transfer. The incrementer 320 generates a first memory address 111 corresponding to the memory base address 222. Thereafter, via the trigger control signal 312, the incrementer 320 generates contiguous memory addresses. As is common in the art, the incrementer 320 may only be required to generate a first memory address 111, and thereafter generate abbreviated signals (not shown) that signal the memory 180 to provide access 185 to the next contiguous memory addresses. The register address generator 330 utilizes the register mask 212 to generate register addresses 112 relative to the register base address 226. The register mask 212 for example, may contain the values 3, 5, 2, 9, indicating which registers, relative to the register at the register base address RBase, correspond to the data elements located at contiguous memory addresses MBase through MBase+3. The register address generator 330 will generate addresses RBase+3, RBase+5, RBase+2, and RBase+9, synchronously with the incrementer 320's generation of addresses MBase, MBase+1, MBase+2, and MBase+3, respectively.

Figure 4:
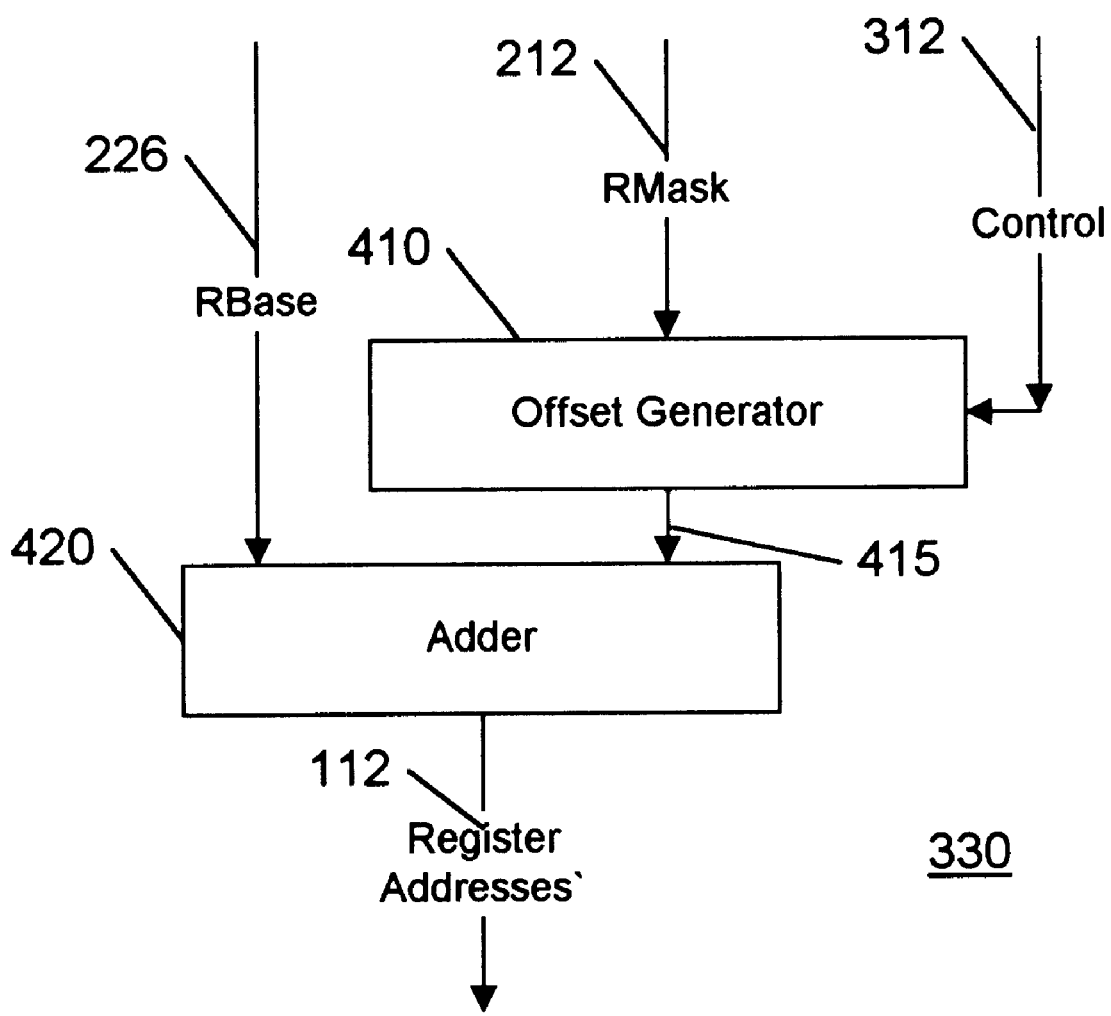
FIG. 4 illustrates a block diagram of an embodiment of a register address generator in accordance with this invention.

FIG. 4 shows a block diagram of an embodiment of a register address generator that includes an offset generator 410 and an adder 420. The offset generator receives the register mask 212, and under the control of the trigger control signal 312, generates an offset value 415 upon each assertion of the trigger control signal 312. In the above example, the register mask 212 contained the values 3, 5, 2, and 9, in some form. The offset generator extracts each value separately from the register mask 212 and provides the appropriate offset value 415 to the adder 420 synchronously with the trigger control signal. Note that, for efficiency, the register mask 212 may contain values that are encoded or packed in a particular format; the offset generator 410 in this case performs the decoding or unpacking as required to provide the appropriate offset value 415 to the adder 420. The adder 420 adds the synchronously generated offset value 415 to the register base address 226, to provide a series of register addresses synchronous with the trigger control signal 312.

Often, the variable format command 195b is encoded as a set of bit values. Commonly, the possible set of parameters which may be communicated are specified in a particular order. Consider, for example, a predefined parameter ordering of X, Y, Z, C, T, U, V. The variable format command may be encoded in an 8 bit byte, such that the first bit, bit0, is associated with X, the second bit, bit1, with Y, . . . the fifth bit, bit4, with T, and so on. A bit value of 1 indicates that the parameter is contained in the contiguous block of memory addresses being accessed. That is, for example, a variable format command having bits 0, 1, 3, and 5 set to 1, and the others set to zero, communicates the fact that the contiguous data elements in memory correspond to the X, Y, C, and U parameters, respectively. The register mask 212 and the conversion mask 216 may also use a similar encoding scheme.

Figure 5:
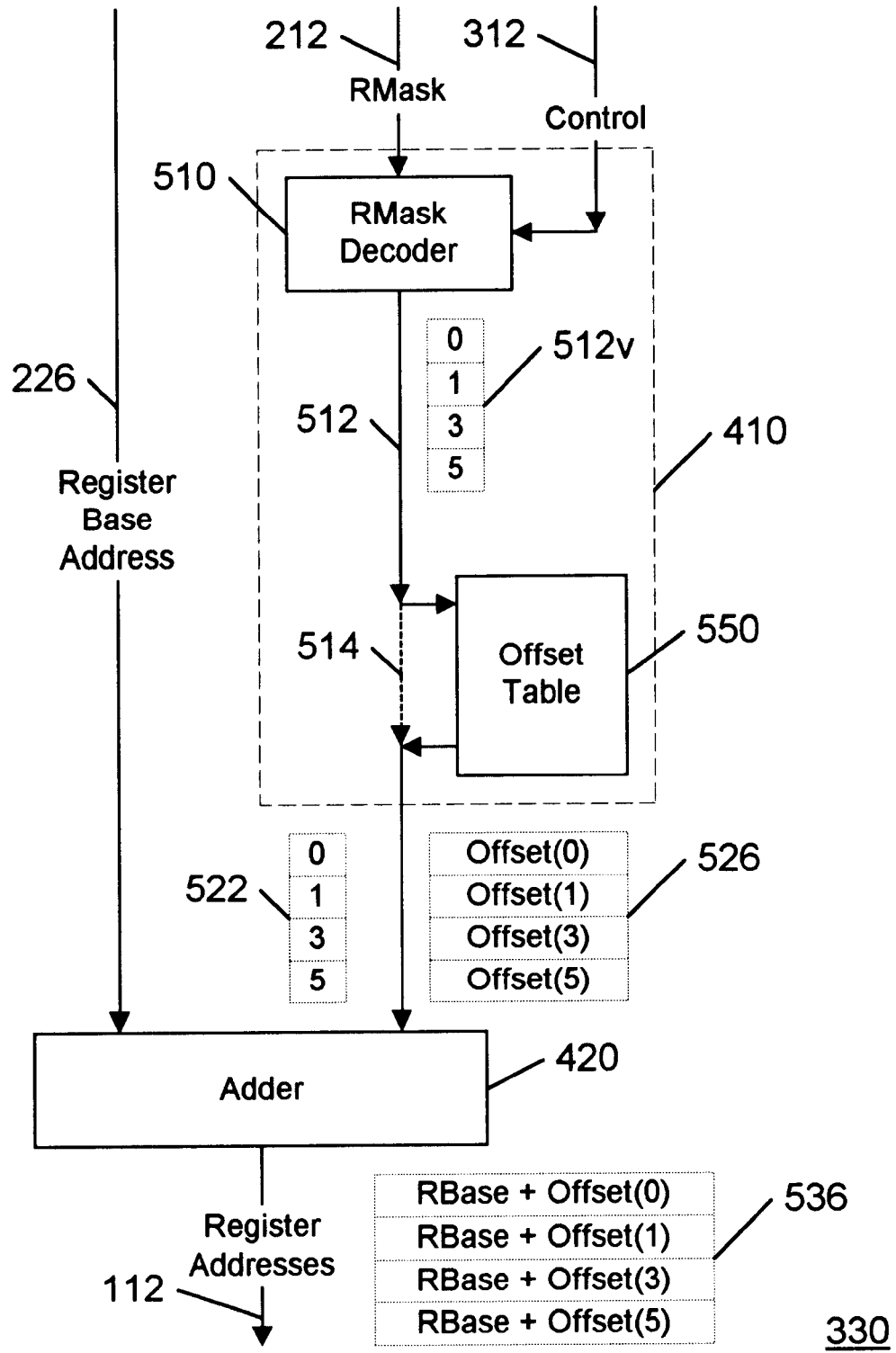
FIG. 5 illustrates a block diagram of an embodiment of a register address generator in accordance with this invention.

FIG. 5 shows a block diagram of an embodiment of a register address generator 330 that includes a register mask decoder 510, an offset table 550 and an adder 420. The register mask decoder 510 decodes a register mask 212 into a series of indexes 512 corresponding to and synchronous with the series of contiguous memory addresses 111. The synchronization is effected by the trigger control signal 312. Shown in FIG. 5 is an encoded register mask 212 having an example encoded mask value 212v of 00101011. The register mask decoder 510, synchronized by trigger control signal 312, produces a series of index values 512v of 0, 1, 3, 5 from this example encoded mask value 212v, corresponding to the fact that bits 0, 1, 3, and 5 of the register mask 212 are set to 1. Each of the indexes 512 are provided in sequence to offset table 550 which provides a corresponding offset value 415 which indicates the corresponding register address, relative to the register base address 226. Corresponding to the example register mask value 212v of 00101011, the offset table 550 provides the sequence of offset values 526 of offset(0), offset(1), offset(3), and offset (5), which in the above example, will correspond to the offset of the register addresses for containing the parameters X, Y, C, and U, relative to the register base address 226. The adder 420 adds each offset value 415 to the register base address to provide each of the register addresses 112 corresponding to each of the contiguous memory addresses 111. Shown by dashed line 514, if the registers 170 have been allocated to the parameters in the same order that they are encoded in the register mask 212, the indexes 512 may be used directly to determine the register addresses 112, thereby obviating the need for an offset table 550. That is, in the above example, if the registers are ordered as X, Y, Z, C, T, U, V then the register addresses corresponding to the X, Y, C, and U parameters are offset from the register base address 226 by offset values of 0, 1, 3, and 5, respectively.

Figure 6:
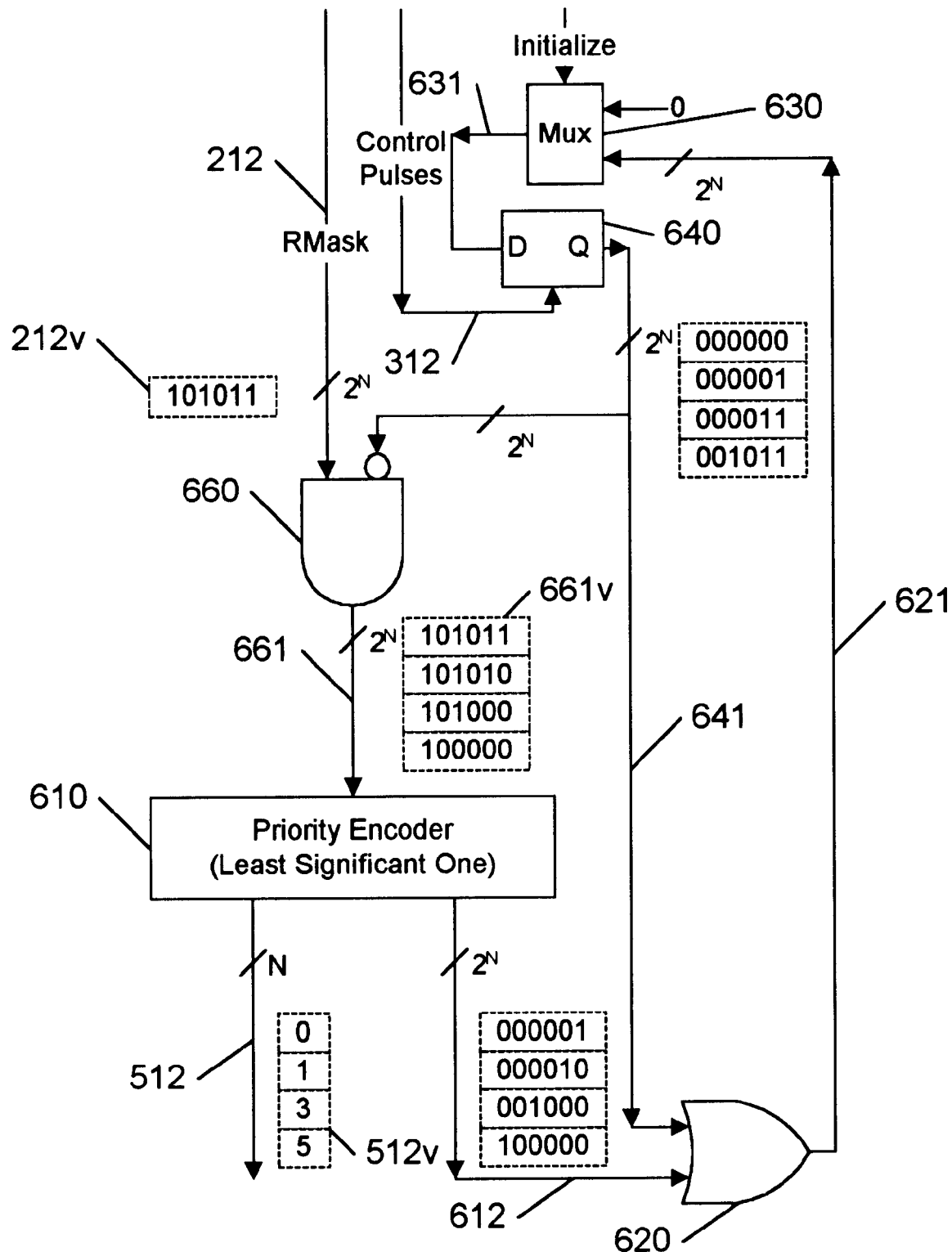
FIG. 6 illustrates a block diagram of an embodiment of a register mask decoder in accordance with this invention.

FIG. 6 shows a block diagram of an embodiment of a register mask decoder 510 that includes a priority encoder 610 that is synchronized by the trigger control signal 312 to produce a series of indexes 512 corresponding to the set bits of the register mask 212. The trigger control signal 312 controls a flip-flop 640 having an input 631 that represents each of the bits of the register mask 212 that have been processed thus far. Initially, the input 631 is set to 0 by the multiplexer 630, via an initialize signal 601 which is asserted by the address generator 110 at the start of each set of addresses to be generated. This initialize signal 601, for example, could be the done signal 315 shown in FIG. 3, for initializing address generator 110 at the end of each set of address generations, in preparation for the next data access command 195a from the processor 190. The output 641 of the flip flop 640 identifies the bits that have been processed in previous trigger control cycles 312. The AND gate 660 forms the intersection 661 of the register mask 212 and the inverse of the output 641. Thus, the intersection 661 represents those bits of the register mask 212 that have not yet been processed. The priority encoder 610 determines the bit location of the least significant bit that is set in the intersection 661, and provides it as the next index 512. It also provides an extraction 612 of this least significant set bit. This extraction 612 identifies the bit that has been processed at the current trigger control cycle 312. The OR gate 620 forms the union 621 of the extraction 612 and the output 641, representing the bits of the register mask 212 that have been processed thus far. This union 621 becomes the input 631 to the flip flop 640, awaiting the arrival of the next trigger control signal 312. As shown, the indexes 512 are generated in synchronization with the trigger control signal 312, and thus in synchronization with the corresponding memory addresses 111.

As would be evident to one of ordinary skill in the art, the embodiments as presented thus far can be implemented in hardware, software, or a combination of both. For example, the mask generator 210 and command analyzer 220 may be implemented as a software program embedded in firmware for execution by the processor 190, while the data mapper 240 is implemented as a hardware circuit.

Figure 7:
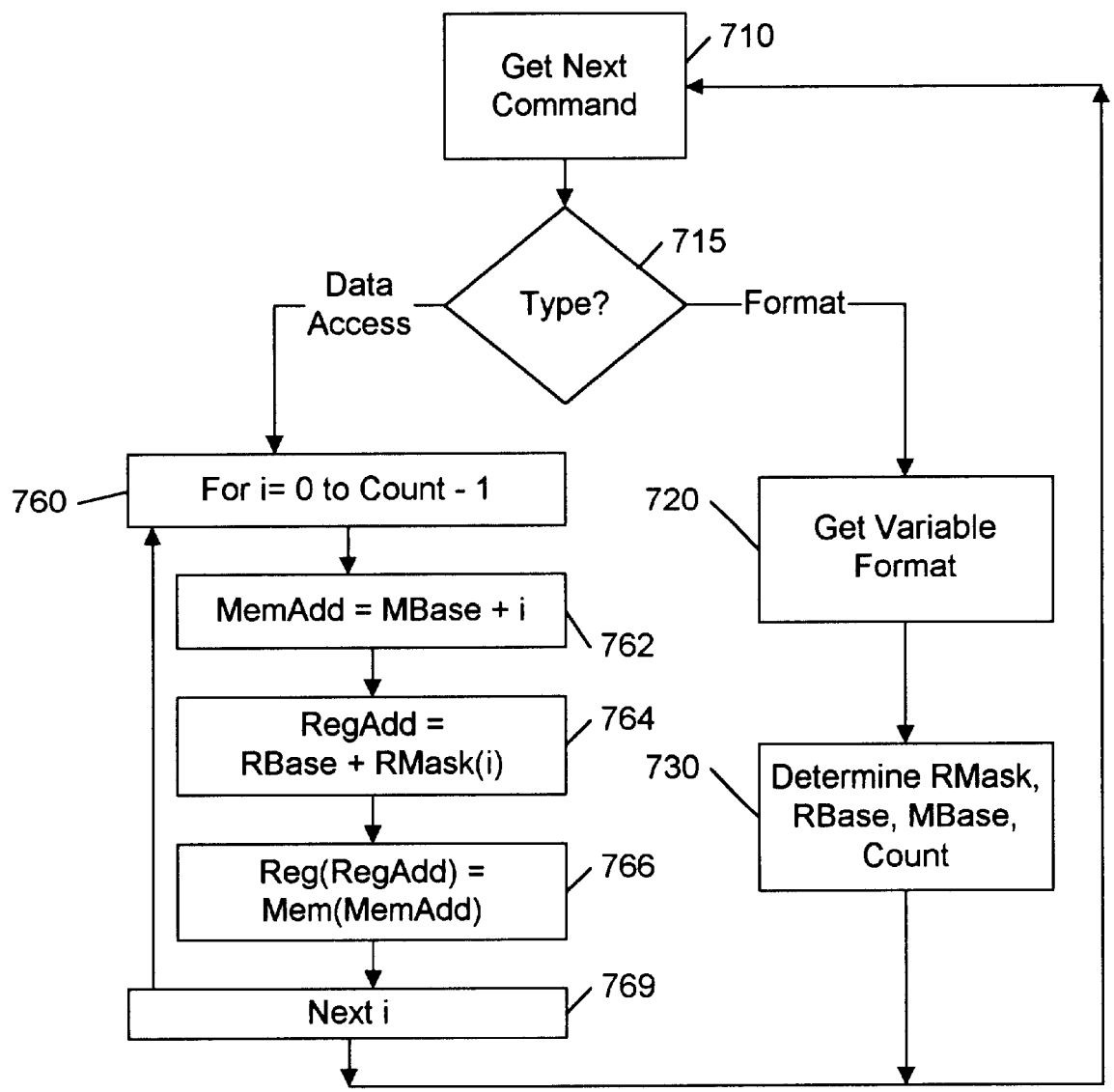
FIG. 7 illustrates a flowchart for a memory access device in accordance with this invention.

FIG. 7 shows, in general, a flowchart for transferring data from memory to a plurality of registers, as might be utilized, for example, in an embodiment of a memory access device 100 as shown in FIGS. 1 and 2. The memory access device 100 receives a command 195, at block 710. If, at 715, the command 195 is a variable format command 195b, the address generator 110 processes the variable format, at 720, and determines RMask 212, RBase 226, MBase 222, and Count 224, at 730. The RMask 212 identifies the addresses of the registers 170 relative to the RBase 226 that correspond to contiguous memory addresses relative to the MBase 222. The Count 224 identifies the number of data elements that are to be transferred. After processing the variable format command 195b, the memory access device 100 returns to 710, to receive the next command.

If, at 715, the command is a data command 195a, the address generator 110 iterates through the loop 760–769 for the Count 224. At 762, a sequential memory address 111 is generated, relative to MBase 222. At 764, a register address 112 is generated corresponding to the memory address 111, based on RBase 226 and RMask 212. The contents of the register 170 at the register address 112 is loaded with the contents of the memory 180 at memory address 111, at 766. After transferring Count 224 data elements from the memory 180 to the registers 170, the memory access device 100 returns to 710, to receive the next command.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A memory access device comprising:
   means for receiving a plurality of data elements from a memory, wherein the means for receiving includes a plurality of registers, and means, operably coupled to the means for receiving the plurality of data elements, for synchronously generating:

at least two contiguous memory addresses from which to receive at least two data elements of the plurality of data elements and at least two noncontiguous register addresses, based on a variable format command, corresponding to the at least two contiguous memory addresses to facilitate storage of the at least two data elements into registers of a plurality of registers corresponding to the at least two noncontiguous register addresses.

2. The memory access device of claim 1, wherein the variable format command is based on a Microsoft DirectX™ flexible vertex format ID.

3. The memory access device of claim 1, further including a means operably coupled to the plurality of registers, for processing the plurality of data elements based on a predetermined allocation of register addresses.

4. The memory access device of claim 3, wherein the at least two noncontiguous register addresses are based on a variable format command.

5. The memory access device of claim 4, wherein the variable format command is based on a Microsoft DirectX™ flexible vertex format ID.

6. The memory access device of claim 3, wherein the means for processing the plurality of data elements provides a data access command to the means for generating the at least two memory addresses and the at least two register addresses to effect the generating of the at least two memory addresses and the at least two register addresses.

7. The memory access device of claim 6, wherein the data access command comprises at most three parameters, the at most three parameters being a count, a memory base address, and a register base address.

8. The memory access device of claim 1, further including means, operably coupled to the means for receiving the plurality of data elements, for converting one or more of the plurality of data elements from a first data format to a second data format.

9. A data processing apparatus comprising:

a mask generator that determines a register mask based on a variable format command, a command analyzer that determines a memory base address, a register base address, and a count based on a data access command, a data mapper operably coupled to the mask generator and the command analyzer to receive the register mask, the memory base address, the register base address, and the count, and to produce therefrom a plurality of contiguous memory addresses and a corresponding plurality of noncontiguous register addresses, a memory operably coupled to the data mapper to provide a plurality of data elements from a plurality of memory locations corresponding to the plurality of contiguous memory addresses, a plurality of registers operably coupled to the data mapper to store each of the plurality of data elements to an each of noncontiguous registers of the plurality of registers, each of the noncontiguous registers corresponding to each of the plurality of noncontiguous register addresses.

10. The data processing apparatus of claim 9, wherein the mask generator also determines a conversion mask based on the variable format command, and the data processing apparatus also includes a data converter operably coupled between the memory and the plurality of registers to receive the plurality of data elements from the memory and to modify at least one of the plurality of data elements based on the conversion mask.

11. The data processing apparatus of claim 9, wherein the plurality of registers are also operably coupled to provide the plurality of data elements from the noncontiguous registers, and the memory is also operably coupled to store the plurality of data elements to the plurality of contiguous memory addresses.

12. The data processing apparatus of claim 9, wherein the data mapper includes:

a controller that provides a series of control signals based on the count, an incrementer operably coupled to the controller to provide the plurality of contiguous memory addresses based on the memory base address and the series of control signals, a register address generator operably coupled to the controller to provide the plurality of noncontiguous register addresses based on the register base address and the series of control signals.

13. The data processing apparatus of claim 12, wherein the register address generator includes:

an offset generator that provides a series of offset values corresponding to the series of control signals based on the register mask, an accumulator operably coupled to the offset generator that adds the register base address to each of the series of offset values to produce the plurality of noncontiguous register addresses.

14. The data processing apparatus of claim 13, wherein the offset generator includes:

control logic that provides a series of mask values based on the register mask and the series of control signals, and a priority encoder operably coupled to the control logic that provides the series of offset values based on the series of mask values.

15. The data processing apparatus of claim 9, further including a processor operably coupled to the plurality of registers that processes the plurality of data elements based on a fixed format data structure.

16. The data processing apparatus of claim 15, wherein the processor is also operably coupled to the command analyzer, and wherein the processor provides the data access command to effect the storage of the plurality of data elements to the noncontiguous registers and thereby provide the plurality of data elements in the fixed format data structure.

17. The data processing apparatus of claim 16, wherein the data access command is a single load command with at most three parameters, the at most three parameters being the count, the memory base address, and the register base address.

18. The data processing apparatus of claim 9, wherein the variable format command is based on a Microsoft DirectX™ flexible vertex format ID.

19. A method of memory access comprising the steps of:

receiving a variable format command, synchronously generating a plurality of contiguous memory addresses and corresponding noncontiguous register addresses based on the variable format command, and communicating each of a plurality of data elements from each of the plurality of contiguous memory addresses of a memory to each of a plurality of registers corresponding to each of the plurality of non-contiguous register addresses.

20. The method of claim 19, wherein the variable format command is based on a Microsoft DirectX™ flexible format ID.

21. The method of claim 19, further including the step of
processing the plurality of data elements based on a predetermined allocation of register addresses.

22. The method of claim 19, further including the step of
converting one or more of the plurality of data elements from a first data format to a second data format.

23. A data apparatus comprising:

an address generator operative to receive a command input, a first storage device having a plurality of data storage locations, a second storage device also having a plurality of data storage locations, wherein the address generator is operatively coupled to the second storage device, and synchronously generates at least two contiguous first storage device addresses and at least two noncontiguous second storage device addresses, and wherein the second storage device is operatively coupled to the address generator and wherein the first storage device, stores at least two data elements into the storage locations corresponding to the two noncontiguous second storage device addresses.

24. The data apparatus of claim 23, wherein the first storage element is a memory.

25. The data apparatus of claim 23, wherein the first storage element includes a register.

26. The data apparatus of claim 23, wherein the second storage element is a memory.

27. The data apparatus of claim 23, wherein the second storage element includes a register.

28. The data apparatus of claim 23, wherein the at least two noncontiguous second storage device addresses are based on a variable format command.

29. The data apparatus of claim 23, further including a processor, operably coupled to the second storage device, for processing the plurality of data elements based on a predetermined allocation of second storage device addresses.

30. The data apparatus of claim 29, wherein the processor provides a data access command to the address generator to effect the generating of the at least two first storage device addresses and the at least two second storage device addresses.

31. The data apparatus of claim 30, wherein the access command comprises at most three parameters, the at most three parameters being a count, a memory base address, and a second storage base address.

32. The data apparatus of claim 23, further including a data converter, operably coupled to the address generator, for converting one or more of the plurality of data elements from a first data format to a second data format.

* * * * *